United States Patent [19]
Sakamoto

[11] Patent Number: 5,965,804
[45] Date of Patent: Oct. 12, 1999

[54] KNOCK SENSOR

[75] Inventor: Makoto Sakamoto, Fukushima, Japan

[73] Assignee: Unisia Jecs Corporation, Atsugi, Japan

[21] Appl. No.: 08/990,837

[22] Filed: Dec. 15, 1997

[30] Foreign Application Priority Data

Dec. 19, 1996 [JP] Japan .................................. 8-354431

[51] Int. Cl.$^6$ ...................................................... G01L 1/10
[52] U.S. Cl. ........................ 73/35.11; 310/321; 73/35
[58] Field of Search ........................... 310/321; 73/35, 73/654, 35.11, 514.34, 35.09

[56] References Cited

U.S. PATENT DOCUMENTS

| | | | |
|---|---|---|---|
| 4,225,802 | 9/1980 | Suzuki et al. | 310/321 |
| 4,379,404 | 4/1983 | Hamisch et al. | 73/35 |
| 4,944,179 | 7/1990 | Komurasaki | 73/35 |
| 5,635,629 | 6/1997 | Imai et al. | 73/35.11 |

*Primary Examiner*—Hezron Williams
*Assistant Examiner*—Thuy Vinh Tran
*Attorney, Agent, or Firm*—Foley & Lardner

[57] ABSTRACT

A knock sensor employs a piezoelectric element and includes a ring-shaped weight which has a chamfered surface portion formed at an inner peripheral edge of the weight. The knock sensor basically comprises a housing which includes a disc-shaped flange portion and a cylinder portion covered with an insulating tube. A lower lead plate, the piezoelectric element, an upper lead plate, an insulating sheet, a weight, a disc spring, and a nut are stacked on the flange portion and disposed around the cylinder portion in the order of mention. The nut is tightly screwed to the external thread portion of the cylinder portion to fixedly sandwich the stacked parts with the flange portion of the housing.

11 Claims, 10 Drawing Sheets

KNOCK SENSOR

BACKGROUND OF THE INVENTION

1. Field of the Invention

The present invention relates to improvements in a knock sensor which detects vibrations of a cylinder block of an internal combustion engine by means of a piezoelectric element.

2. Description of the Related Art

Generally, to increase a compression ratio of a gasoline engine effectively improves a thermal efficiency of the engine although an octane number of gasoline, which is measure of the anti-knock properties, limits this improvement of the thermal efficiency. In case of a turbo-charged engine, it is important to effectively operate the engine so as not to generate knocking. Therefore, a knocking control system is employed in such a turbo-charged engine so as to maintain the high compression ratio of the engine as possible. Such a knocking control system is arranged to detect vibrations of an engine block by means of a knock sensor and to delay a spark timing of the engine if the knock sensor detects a knocking of the engine. The knock sensor employed in the knocking control system is generally arranged as shown in FIG. 11.

Figure 11:
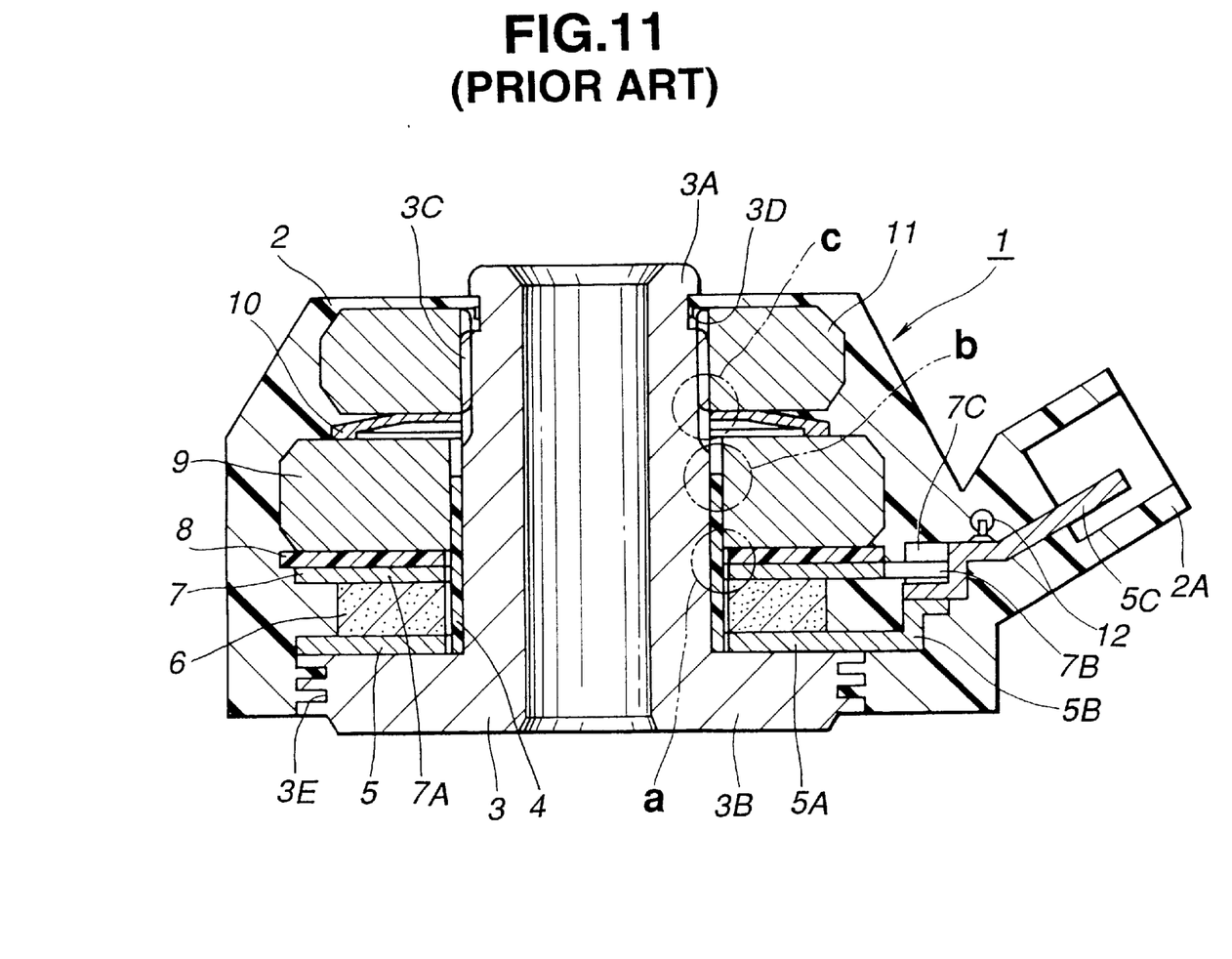
FIG. 11 is a cross sectional view which shows a conventional knock sensor.

A knock sensor 1 shown in FIG. 11 comprises a cover portion 2 including a connector portion 2A. A housing 3 is constituted by a disc shaped flange portion 3A and a cylinder portion 3B which extends from a center portion of the flange portion 3A in the direction perpendicular to a surface of the flange portion 3A. An external thread portion 3C is formed at an upper portion of the cylinder portion 3B. An upper groove portion 3D is formed at an upper end portion of the cylinder portion 3B and at a portion located in the vicinity of an upper end of the external thread portion 3C. A lower groove portion 3E including three flange portions is formed at an outer periphery of the flange portion 3A. The upper and lower groove portions 3D and 3E are engaged with the cover portion 2 and function to prevent water from entering into an inside space of the cover member 2.

An insulating tube 2 made of a heat-shrinkable material is set at an outer periphery of the cylinder portion 3B. An end of the insulating tube 4 is in contact with the flange portion 3A, and the other end of the insulating tube 4 extends to a center portion of the cylinder portion 3B and in the vicinity of an upper end of the external thread portion 3C. The insulating tube 4 is fittingly connected with the cylinder portion 3B by heating it after installed on the cylinder portion 3b. The insulating tube 4 functions to insulate the cylinder portion 3B from a lower lead plate 5, an piezoelectric element 6, an upper lead plate 7 and a weight.

The lower lead plate 5 made of conductive metal is formed into a ring-shaped disc having a center hole. The lower lead plate 5 is constituted by a disc portion 5A, an arm portion 5B outwardly projecting from an outer periphery of the disc portion 5A, and a terminal portion 5c welded to the arm portion 5B. The lower lead plate 5 is set to be in contact with a lower surface of the piezoelectric element 6 under the assembled condition.

The ring-shaped piezoelectric element 6 is set around the cylinder portion 3B of the housing 3 so as to be in contact with the lower lead plate 5 set on the upper surface of the flange portion 3A. The piezoelectric element 6 is made of piezoelectric material such as lead titanate. The piezoelectric element 6 is, for example, constituted by d33-element which has a characteristic that the directions of a strain axis, a polarization axis, and a signal axis correspond with respect to the axis of the element 6. That is, the piezoelectric element 6 generates a voltage signal corresponding to the oscillating pressure applied in the axial direction thereof.

The upper lead plate 7 made of conductive metal is formed into a ring-shaped disc having a center hole. The upper lead plate 7 is constituted by a disc portion 7A, an arm portion 7B outwardly projecting from an outer periphery of the disc portion 7A, and a terminal portion 7C welded to the arm portion 7B. The upper lead plate 7 is set to be in contact with an upper surface of the piezoelectric element 6 under the assembled condition.

An insulating sheet 8 made of insulating resin is formed into a ring-shaped disc having a center hole. The insulating sheet 8 is installed to the cylinder portion 3B of the housing 3 to be located on an upper surface of the upper lead plate 7 so as to insulate the upper lead plate 7 from the weight 9. The weight 9 made of metal such as steel is formed into a ring-shape or short cylinder and is installed to the cylinder portion 3B of the housing 3 to be located on the insulating sheet 8. The weight 9 together with a disc spring 10 and a nut 11 function to apply a pre-load to the piezoelectric element 6. The disc spring 10 is formed, for example, into an initially coned disc spring or wave washer. The disc spring 10 is installed around the cylinder portion 3B so as to be located on the weight 9. The nut 11 is screwed with the external thread portion 3C of the housing 3. By screwing the nut 11 with the external thread portion 3C, the lower lead plate 5, the piezoelectric element 5, the upper lead plate 7, the insulating sheet 8, the weight 9 and the disc spring 10 are fixed with the housing 3 so that the pre-load is applied to the piezoelectric element 6 through the disc spring 10 and the weight 9. The nut 11 is tightly screwed to the external thread portion 3C of the cylinder portion 3B so as to fixedly sandwich the lower lead plate 5, the piezoelectric element 6, the upper lead plate 7, the insulating sheet 8, the weight 9 and the disc spring 10 between the nut 11 and the flange portion 3A of the housing 3. A resistor for picking up a voltage has a resistance value 560 kΩ and is installed between the upper and lower lead plate 5 and 7.

The procedure for producing the knock sensor 1 is executed as follow:

(1) The cylinder portion 3B of the housing is covered with the insulating tube 4.

(2) The lower lead plate 5, the piezoelectric element 6, the upper lead plate 7, the insulating sheet 8, and the weight 9 are, in turn, installed to the cylinder portion 3B of the housing 3.

(3) Upon installing the disc spring 10 on the weight 9, the nut 11 is screwed with the external thread portion 3C of the housing 3.

(4) The assembled elements are covered with the cover portion 2 by means of a resin molding. Simultaneously, the connector portion 2A of the cover portion 2 is integrally formed with the cover portion 2 so that the terminal portions 5C and 7C project at the connector portion 2A.

The knock sensor 1 constructed as mentioned above is installed to a cylinder block of the engine by inserting a bolt to the cylinder portion 3B of the housing 3 to detect knocking vibrations of the engine.

However, the conventional knock sensor 1 yet has a possibility to generate the insulation defective thereof even if the insulating tube 4 and insulating sheet 8 are provided therein.

SUMMARY OF THE INVENTION

It is an object of the present invention to provide a knock sensor which is further improved so as to prevent the generation of the insulation defective thereof.

A first aspect of the present invention resided in a knock sensor which employs a piezoelectric element and is characterized to include a weight which is formed into a ring shape and includes a chamfered surface portion formed at an inner peripheral edge of the weight. The knock sensor basically comprises a housing including a disc-shaped flange portion and a cylinder portion perpendicularly extending from a center portion of the flange portion, an insulating tube covering the cylinder portion, a lower lead plate formed into a disc shape having a center hole, the piezoelectric element formed into a ring shape, an upper lead plate formed into a disc shape having a center hole, an insulating sheet formed into a disc shape having a center hole, a weight formed into a ring shape, a disc spring, and a nut. The cylinder portion of the housing has an external thread portion. The lower lead plate, the piezoelectric element, the upper lead plate, the insulating sheet, the weight, the disc spring and the nut are stacked on the flange portion and around the cylinder portion in the order of mention. The nut is tightly screwed to the external thread portion of the cylinder portion so as to fixedly sandwich the stacked parts with the flange portion of the housing.

A second aspect of the present invention resides in a knock sensor which is basically the same as that of the first aspect and is characterized such that the cylinder portion of the housing has a circumferential groove to which an end portion of the insulating tube is disposed weight.

A third aspect of the present invention resides in a knock sensor which is basically the same as that of the first aspect and is characterized such that the disc spring and the nut are integrally formed.

BRIEF DESCRIPTION OF THE DRAWINGS

In the drawings, like reference numerals designate like parts and elements throughout the disclosures, in which.

DETAILED DESCRIPTION OF THE INVENTION

The inventor of the present invention has researched on the insulation defective of the conventional knock sensor and found that some burrs were generated at circled portions a, b and c of FIG. 11 and rarely functioned as a factor of insulation defective. The circle portion a is a portion between the upper lead plate 7 and the cylinder portion 3b, the circled portion b is a portion between the cylinder portion 3B and the insulating tube 4, and the circled portion c is a portion between the disc spring 10 and the nut 11, as shown in FIG. 11.

Figure 12:
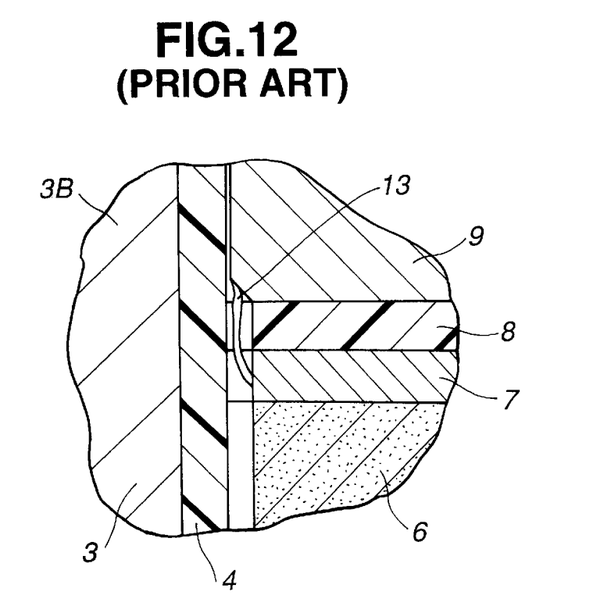
FIG. 12 is an enlarged cross sectional view which shows a circled portion a of FIG. 11.

The insulation defective generated at the circled portion a will be discussed with reference to FIG. 12. The upper lead plate 7 may generate punching burrs 13 when it is produced by means of press forming. If the upper lead plate 7 with the punching burrs 13 is installed to the cylinder portion 3B, the punching burrs 13 may be raised up along the cylinder portion 3B and be in contact with the weight 9. This connection between the upper lead plate 7 and the weight 9 through the punching burrs 13 may generate the insulation defective of the knock sensor 1.

Figure 13:
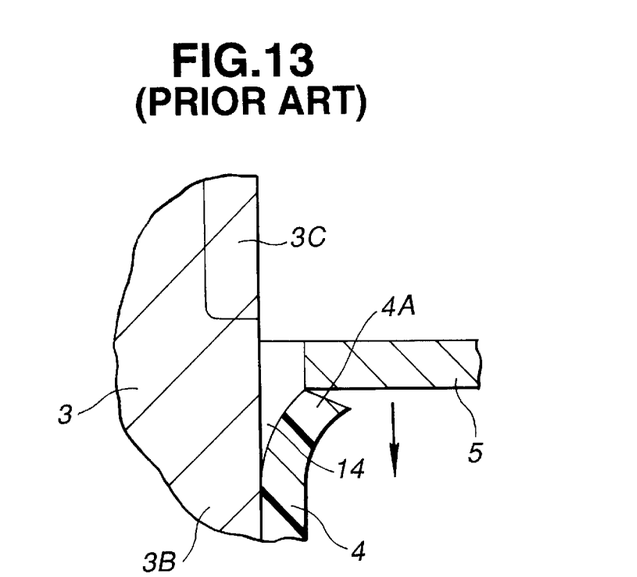
FIG. 13 is an enlarged cross sectional view which shows a circled portion b of FIG. 11.

The insulation defective generated at the circled portion b will be discussed with reference to FIG. 13. When the lower lead plate 5, the piezoelectric element 6, the upper lead plate 7 are installed to the cylinder portion 3B covered with the insulating tube 4, any one of them such as the lower lead plate 5 may be in contact with the end of the insulating tube 4 as shown in FIG. 13. This contact enlarges the diameter of the end portion 4A of the insulating tube 4 to form a clearance between the insulating tube 4 and the cylinder portion 3B as shown in FIG. 13. If the assembling thereof is continued after such enlargement of the diameter of the end portion 4B, burrs generated by the tightening between the nut 11 and the external thread portion 3C may enter into the clearance 14. Thereafter, if the tightening is further continued, the burrs entered into the clearance may function to break the insulating tube 4. This breakage and the burrs may generate the insulation defective between the upper lead plate 7 and the cylinder portion 3B or between the upper lead plate 7 and the weight 9.

Figure 14:
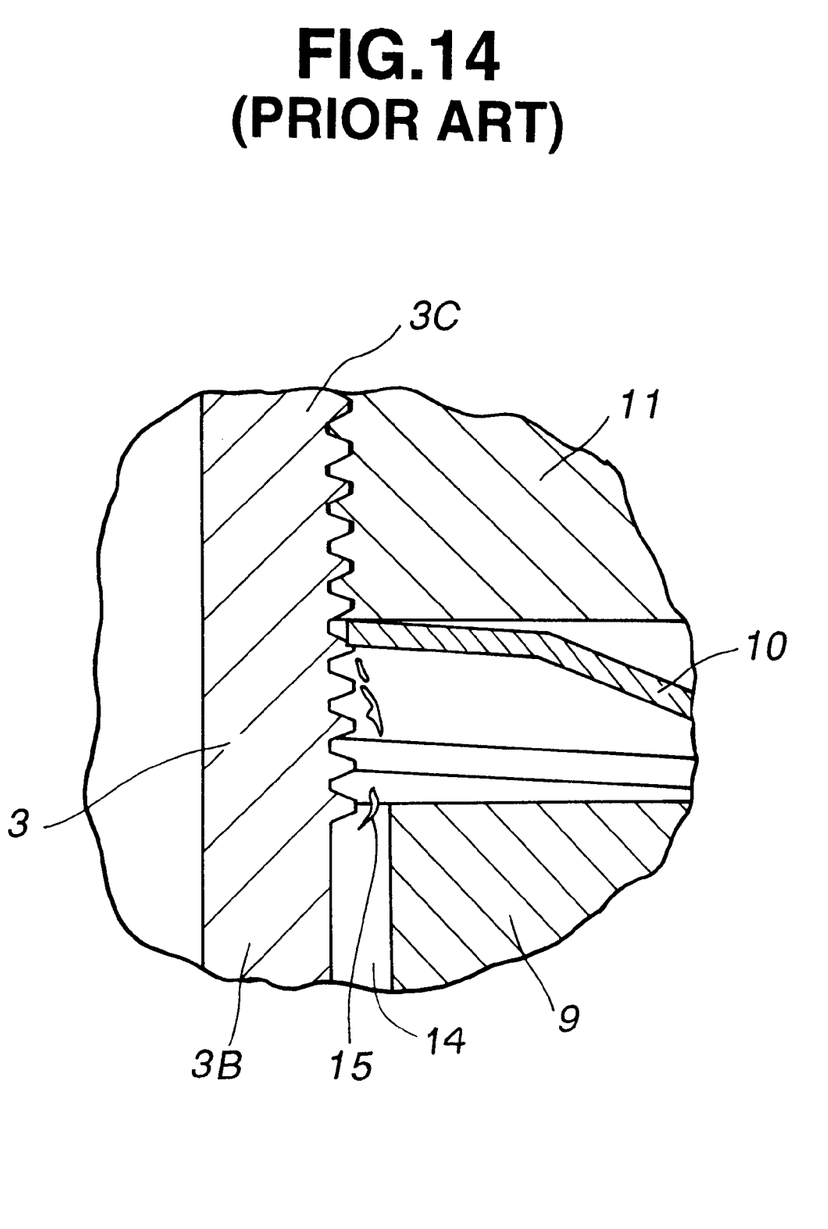
FIG. 14 is an enlarged cross sectional view which shows a circled portion c of FIG. 11.

Next, the insulation defective generated at the circled portion c will be discussed with reference to FIG. 14. When the disc spring 10 is eccentrically assembled, the disc spring 10 may conflict with the external thread portion 3C and generate string-shaped burrs 15, as shown in FIG. 14. The burrs 15 may enter into the clearance 14 and generate the insulation defective of the knock sensor 1.

In order to solve the above-mentioned insulating defectives, the inventors embodied various improvements of a knock sensor as mentioned in the following preferred embodiments according to the present invention.

Figure 1:
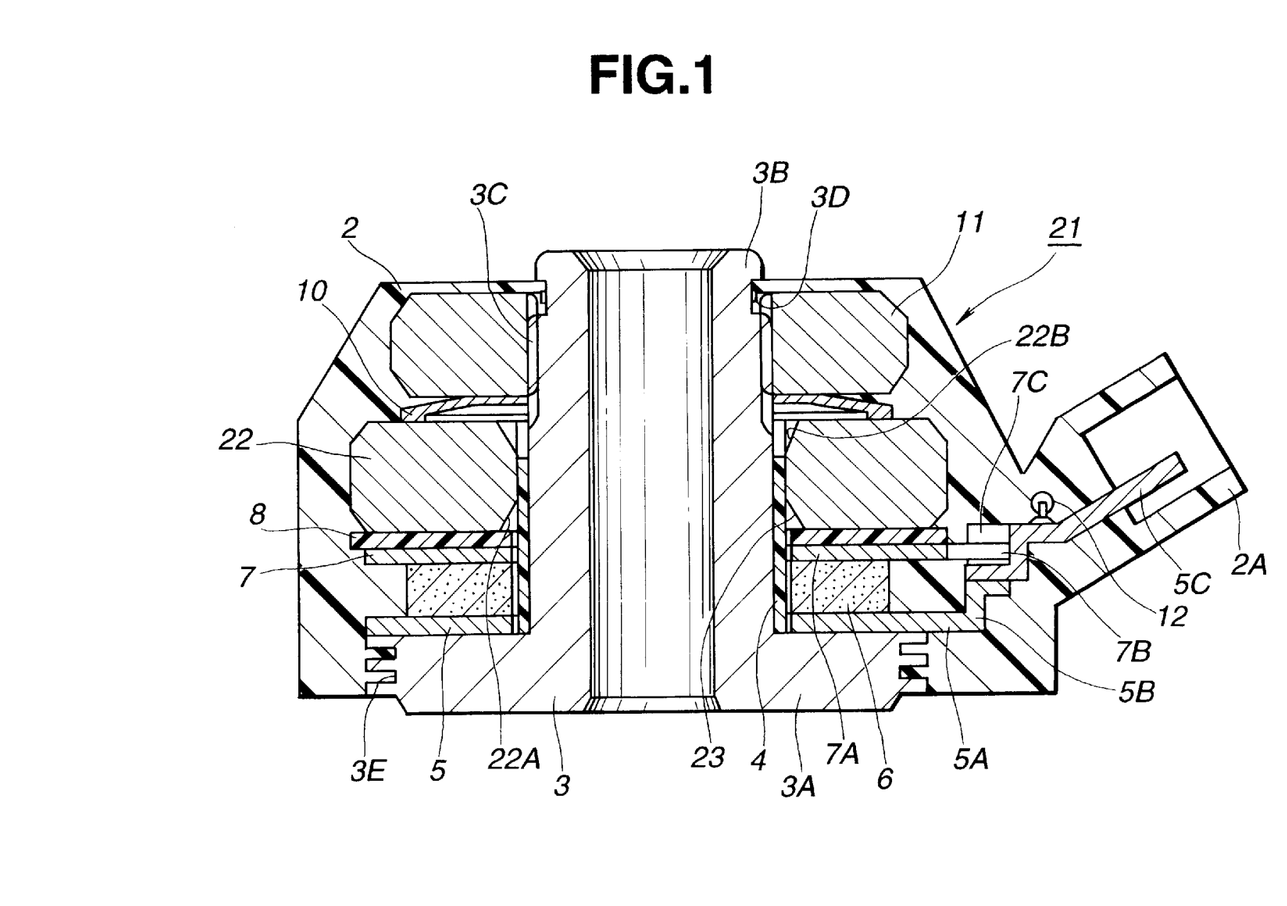
FIG. 1 is a cross sectional view which shows a first embodiment of a knock sensor according to the present invention.
Figure 2:
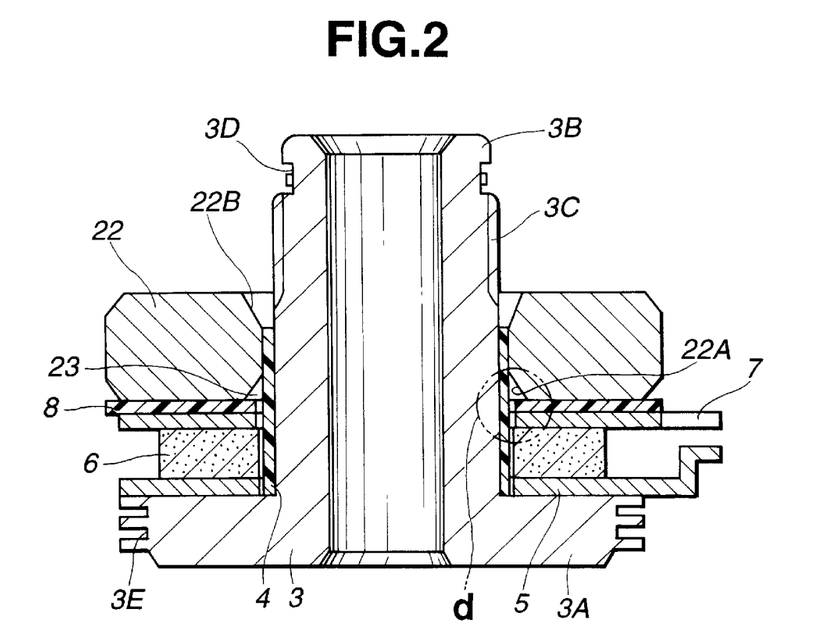
FIG. 2 is a cross sectional view which shows the knock sensor of FIG. 1 under a condition that a lower lead plate, a piezoelectric element, an upper lead plate and an insulating plate and a weight are installed to a cylinder portion of a housing.
Figure 3:
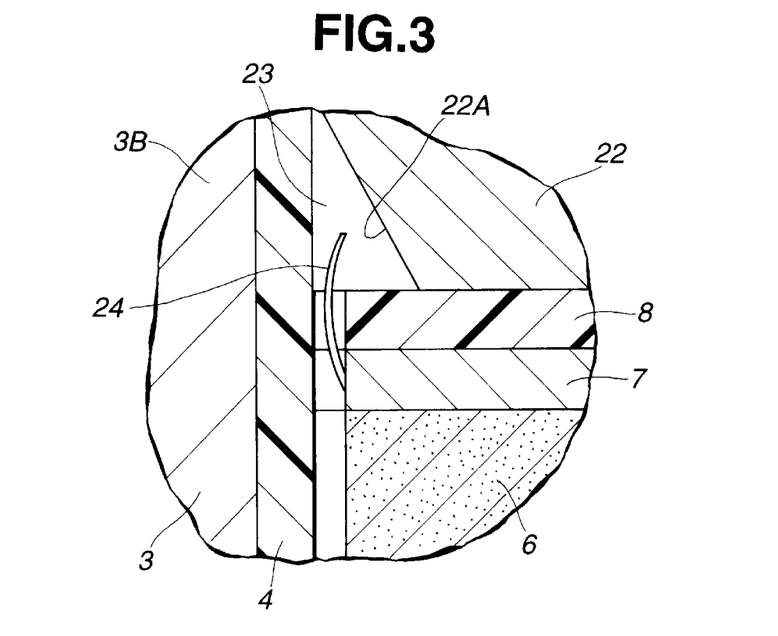
FIG. 3 is an enlarged cross sectional view which shows a circled portion d of FIG. 2.

Referring to FIGS. 1 to 3, there is shown a first embodiment of a knock sensor 21 according to the present invention. The first embodiment is arranged to prevent the insulation defective at the portion a mentioned above.

The knock sensor 21 according to the present invention differs from the conventional knock sensor 1 in the shape of a weight 22. The other parts and elements of the knock sensor 21 are as same as those of the conventional knock sensor 1 mentioned above. Therefore, the same parts and elements are designated by the same reference numerals, and the explanation thereof is omitted herein.

As shown in FIGS. 1 and 2, the weight 22 of the knock sensor 21 of the first embodiment has a lower chamfer portion 22A formed at an inner and lower edge portion of the weight 22 and an upper chamfered portion 22B formed at an inner and upper edge portion of the weight 22. The size of each of the upper and lower chamfer portions 22A and 22B are the same and are formed such that an inner diameter of a contact lower surface of the weight 22 is greater than an inner diameter of each of the insulating sheet 8 and the upper lead plate 7. This provision of the lower and upper chamfer portions 22A and 22B ensures upper and lower spaces 23 with respect to the insulating tube 4.

The knock sensor 21 of the first embodiment is arranged as mentioned above, and the operation thereof as a sensor is as same as that of the conventional knock sensor 1. Therefore, the explanation thereof is omitted herein.

Although the lower and upper lead plates 5 and 7 are produced by press-forming steel plates, punching burrs generated by press-forming may be remained without being removed. In such a case, the punching burrs may be disposed to extend toward the weight 22.

According to the present invention, the weight 22 is installed to the cylinder portion 22 after the lower lead plate 5, the piezoelectric element 6, the upper lead plate 7 and the insulating sheet 8 were installed to the cylinder portion 3B. If the upper lead plate 7 remains punching burrs 24 at its inner periphery, a tip end of the punching burr 24 may be hocked on the insulating tube 4 and may be bent to an inward space. Since the weight 22 of the first embodiment is arranged to form the lower space 23 by the lower chamfer portion 22a, the tip end portion of the burr 24 is inwardly bent by the insulating tube 4 and is directed to the space 23. That is, since the space 23 is formed between the lower inner chamfer portion 22A of the weight 22 and the insulating tube 4, the tip end of the punching burr 24 of the upper lead plate 7 is directed to the space 23, as shown in FIG. 3. This prevents the tip end of the punching burr 24 from being in contact with the weight 22.

As a result, the knock sensor 21 is arranged to prevent the voltage signal generated from the piezoelectric element 6 from flowing through the punching burr 24 to the weight 22. Therefore, the gain or noise of the voltage signal outputted from the knock sensor 21 is cancelled, and the reliability of the knock sensor 21 is improved.

Further, since the chamfered portions 22A and 22B of the weight 22 are formed at the upper and lower inner circumferential edges of the weight 22, it is possible to assemble the knock sensor 21 regardless the direction of the weight 22.

Figure 4:
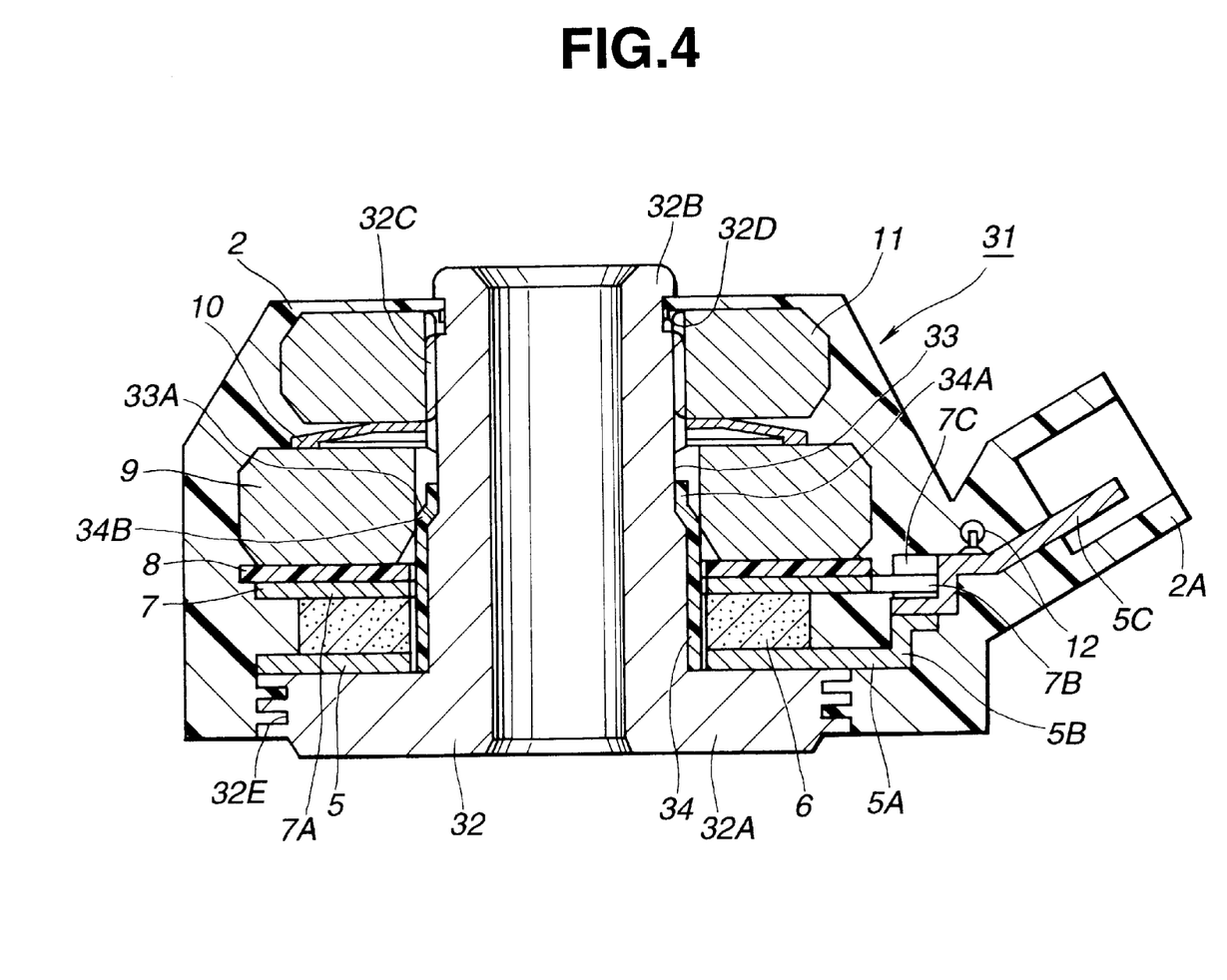
FIG. 4 is a cross sectional view which shows a second embodiment of the knock sensor according to the present invention.
Figure 5:
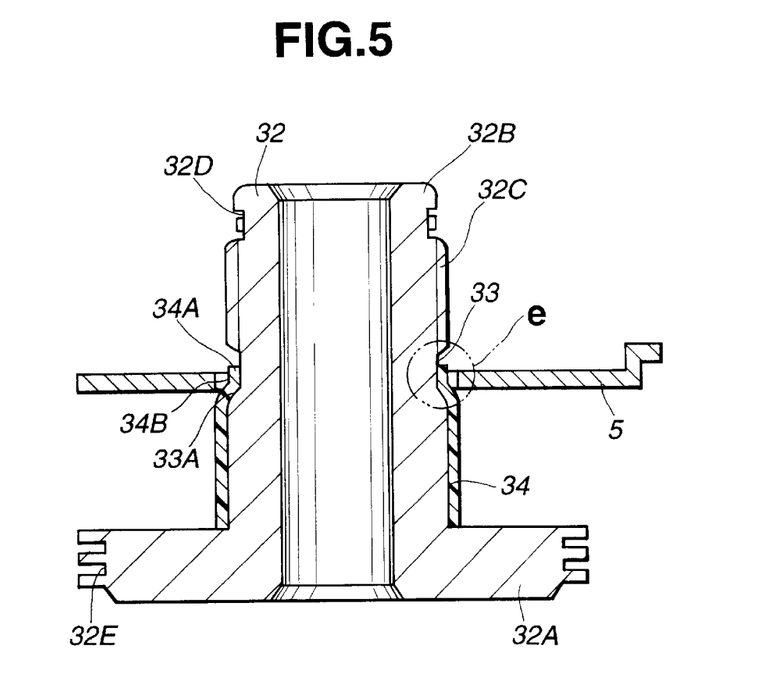
FIG. 5 is a cross sectional view which shows the knock sensor of FIG. 4 under a condition that the lower lead plate is installed to the cylinder portion.
Figure 6:
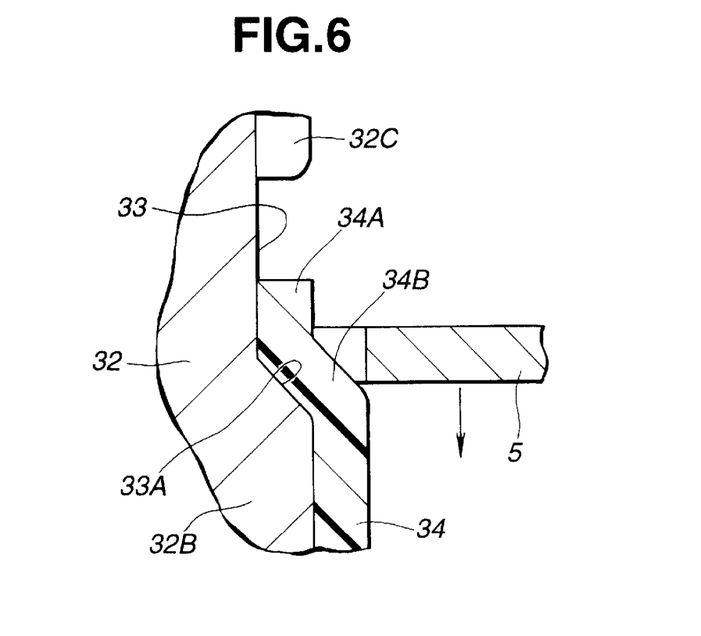
FIG. 6 is an enlarged cross sectional view which shows a circled portion e of FIG. 5.

Referring to FIGS. 4 to 6, there is shown a second embodiment of the knock sensor 31 according to the present invention. The knock sensor 31 of the second embodiment is arranged to prevent the insulation defective at the portion b mentioned above.

The second embodiment is generally similar to the first embodiment except that a cylinder portion 32B of a housing 32 has a circumferential groove 33 at a portion corresponding to an end portion 34A of an insulating tube 34. The circumferential groove 33 has a depth which is greater than a thickness of the insulating tube 34. Therefore, the end portion 34A of the insulating tube 34 is shrunk to fit with the circumferential groove 33 of the cylinder portion 32B. Further, the end portion of the insulating tube 34 is located such that a diametrical thereof is smaller than a normal diameter of the cylinder portion 32B. In this embodiment, the same parts and elements as those of the first embodiment are designated by the same reference numerals and the explanation thereof is omitted herein.

The knock sensor 31 of the second embodiment is constituted by the insulating tube 34 which covers the cylinder portion 32B of the housing 32, the lower lead plate 5, the piezoelectric element 6, the upper lead plate 7, the insulating sheet 8, the weight 9, the disc spring 10 and the nut 11. This knock sensor 31 is different from that of the first embodiment in the shapes of the housing 32 and the insulating tube 34.

The housing 32 has a disc-shaped flange portion 32A and a cylinder portion 32B extending from the flange portion 32A toward the axial direction. An external thread portion 32C is formed at an upper end portion of the cylinder portion 32B. An upper groove portion 32D is formed at a tip end portion of the cylinder portion 32B and at a portion located in the vicinity of an upper end of the external thread portion 32C. A lower groove portion 32E including three flange portions is formed at an outer periphery of the flange portion 32A. The ring-shaped circumferential groove 33 is formed at an intermediate portion of the cylinder portion 32B and at a portion under the external thread portion 32C, as shown in FIG. 5.

The circumferential groove 33 is formed to have a tapered surface 33A at a side of the flange portion 32A as shown in FIG. 6. The tip end portion 34A of the insulating tube 34 is fitted with the taper surface 33A by shrinking thereof as shown in FIG. 6. The lower end of the insulating tube 34 is in contact with the flange portion 32A and the tip end portion 34A of the insulating tube 34 is located in the circumferential groove 33 so as not to project from the circumferential groove 33 to a diametrically outside portion of the cylinder portion 32. The insulating tube 34 is made of a heat-shrinking tube, and therefore the tip end portion 34A of the insulating tube 34 decreases its diameter so as to fit with the circumferential groove 33 and the large diameter portion 34B of the insulating tube 34 gradually increase its diameter from the tip end portion 34A so as to be smoothly follow along the tapered surface 33A by the heating thereof.

The manner of operation of the second embodiment will be discussed hereinafter with reference to FIGS. 5 and 6. Since the operation as a knock sensor in the second embodiment is as same as that of the first embodiment, the explanation thereof is omitted herein.

Since the conventional knock sensor 1 is assembled to generate a clearance between the insulating tube 4 and the cylinder portion 3B, some burrs or metal chips may enter the clearance and generate the insulation defective between the cylinder portion 3B and the upper lead plate 7.

In contrast, since the knock sensor 31 of the second embodiment is arranged such that the circumferential groove 33 formed at the cylinder portion 32B so as to fittingly dispose the tip end portion 34A of the insulating tube 34 therein, the insulating tube 34 is tightly fitted with the cylinder portion 32B so that the tip end portion 34A is shrunk along the circumferential groove 33 and forms the large diameter portion 34B into a smooth surface along the tapered surface 33A, as shown in FIGS. 5 and 6.

Therefore, the parts such as the lower lead plate 5, the piezoelectric element 6, the upper lead plate 7, the insulating sheet 8 and the weight 9 are smoothly installed around the cylinder portion 32B without the contact with the end portion 34B of the insulating tube 34. As a result, when the lower lead plate 5 is installed to the cylinder portion 32B of the housing 32, the tip end portion 34A and the large diameter portion 34B of the insulating tube 34 never prevents the installation of the lower lead plate 5. This prevents the tip end portion 34A of the insulating tube 34 from being enlarged in diameter so as to ensure the insulating strength of the insulating tube 34.

Therefore, since the present invention is arranged to form the circumferential groove 33 for diametrically decreasing the tip end portion 34A of the insulating tube 34, the diametrical enlarging of the tip end portion 34A of the insulating tube 34 is prevented. Further, since the insulating tube 34 is fittingly installed around the cylinder portion 32A without generating a clearance between the insulating tube 34 and the cylinder portion 32A, the insulating trouble due to the insulating tube 34 is certainly prevented. Therefore, the reliability of the knock sensor 31 is further improved.

Referring to FIGS. 7 to 10, there is shown a third embodiment of the knock sensor 41 according to the present invention. The knock sensor 41 of the third embodiment is arranged to prevent the insulation defective at the portion c mentioned above.

Figure 7:
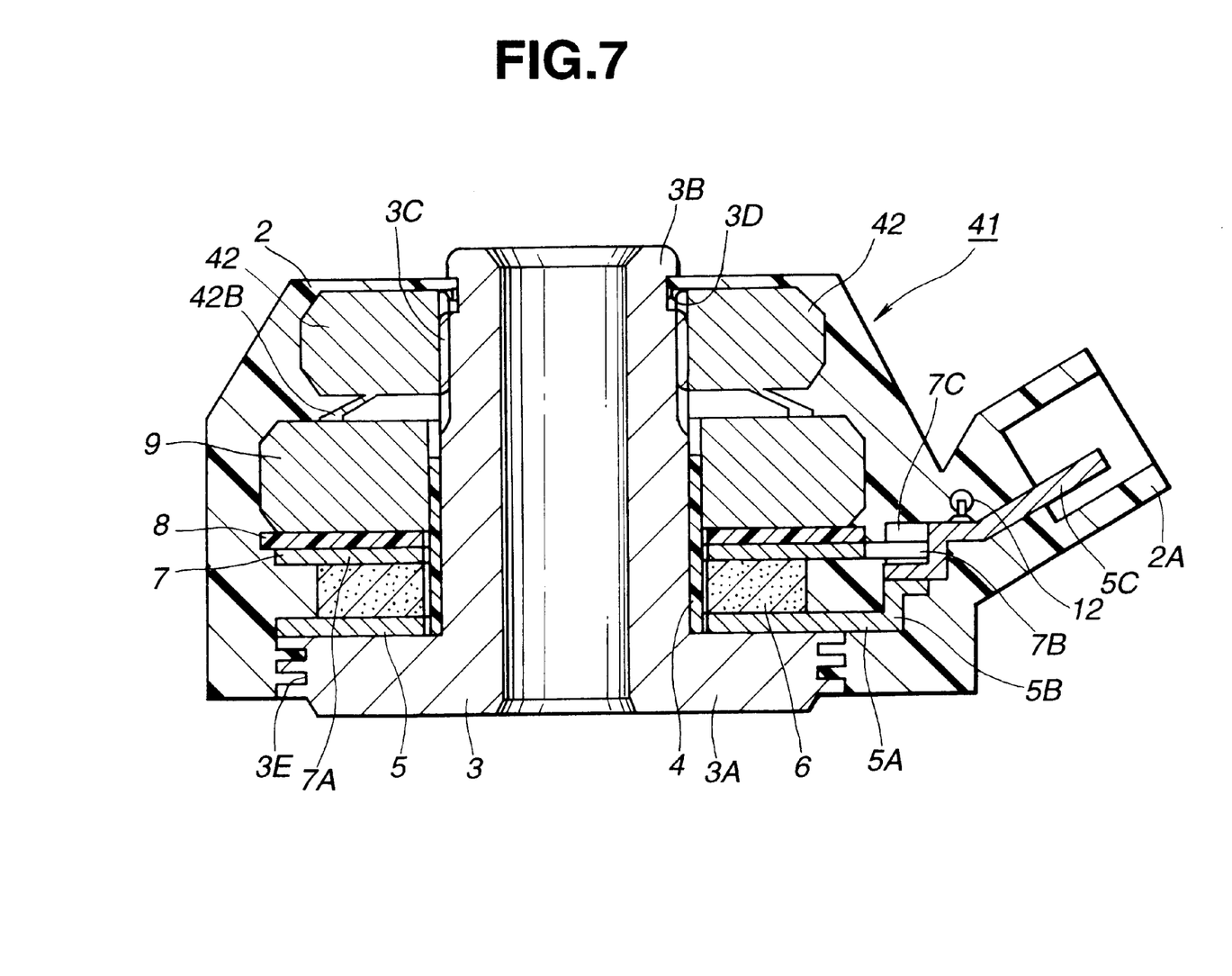
FIG. 7 is a cross sectional view which shows a third embodiment of the knock sensor according to the present invention.

The knock sensor 41 of the third embodiment is generally similar to the first embodiment except that a disc spring and a nut are integrally formed as a washer based nut 42. The same parts and elements as those of the first embodiment are designated by the same reference numerals and the explanation thereof is omitted herein.

The knock sensor 41 of the third embodiment is constituted by an insulating tube 4 which covers the cylinder portion 3B of the housing 3, the lower lead plate 5, the piezoelectric element 6, the upper lead plate 7, the insulating sheet 8, the weight 9 and the washer based nut 42. This knock sensor 31 is different from that of the first embodiment in the shapes of the disc spring and the nut.

Figure 8:
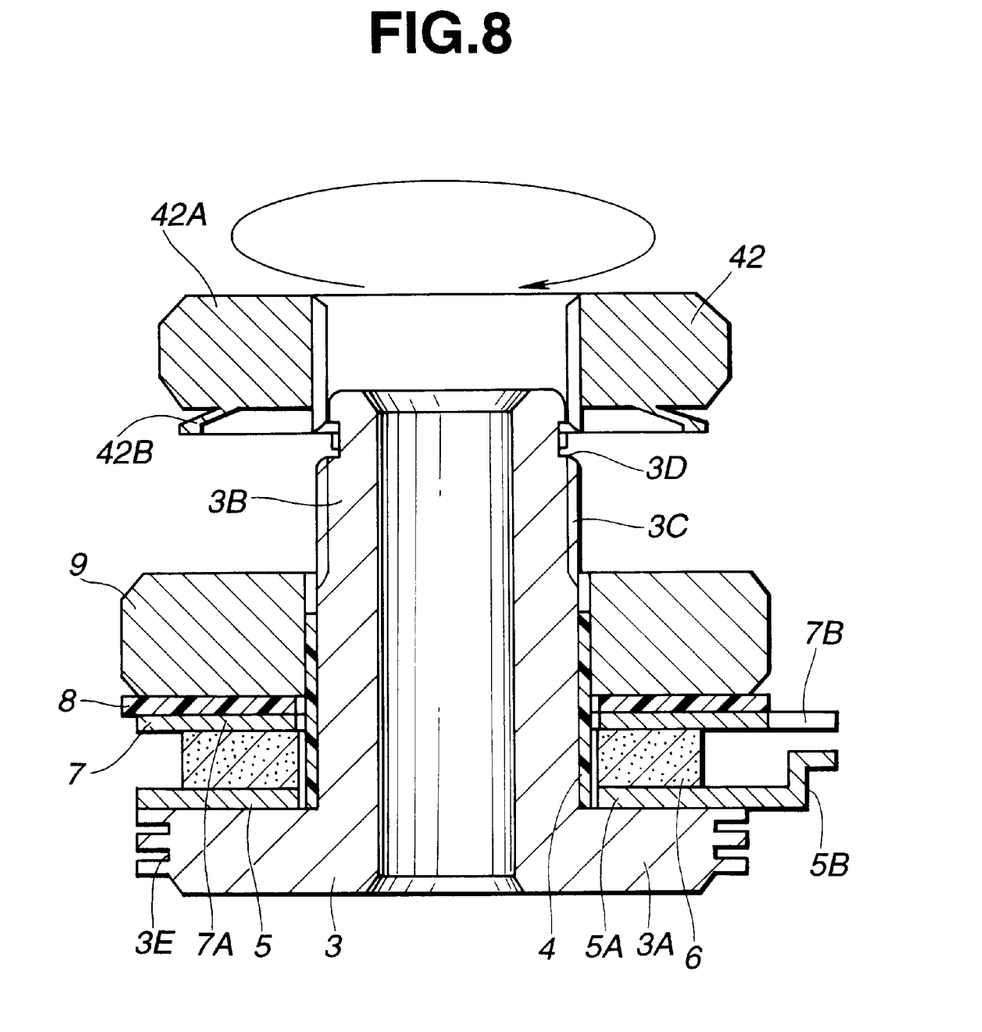
FIG. 8 is a cross sectional view which shows the knock sensor of FIG. 7 under a condition that a washer based nut is screwed to the cylinder portion.

The washer based nut 42 has one-piece structure such that a disc spring and a nut are integrally formed. The washer based nut 42 is constituted by a hexagon nut portion 42A and a washer portion 42B integral with the hexagon nut portion 42A. The washer portion 42B has an elastic characteristic and performs as same as the disc spring 10. By tighteningly screwing the washer based nut 42 with the external thread portion 3C of the cylinder portion 3B after the installation parts such as the lower lead plate 5, the piezoelectric element 6, the upper lead plate 7, the insulating sheet 8 and the weight 9 are installed to the cylinder portion 3C, the installed parts are fixed to the housing 3 and the pre-pressure is applied to the piezoelectric element 6 through the weight 9. The washer portion 42B is formed into an initially coned disc spring shape and may be formed into wave washer shape or trivet-shape.

The manner of operation of the second embodiment will be discussed hereinafter. Since the operation as a knock sensor of the third embodiment is as same as that of the first embodiment, the explanation thereof is omitted herein.

Since the conventional knock sensor 1 employs the nut 11 and the disc spring 10 which are separately produced, the disc spring 10 may be eccentrically assembled and generate string burrs as mentioned above. Further, this burrs may enter into a clearance between the insulating tube 4 and the cylinder portion 3B or between the cylinder portion 3B and the upper lead plate 7. This may generate the insulation defective of the knock sensor 1.

In contrast, since the knock sensor 41 of the third embodiment employs the washer based nut 42, the washer portion 42B is disposed so that the inner periphery thereof is apart from the external thread portion 3C when installed to the cylinder portion 3. This prevents the washer portion 42B from being eccentrically located with respect to the external thread portion 3C. Therefore, when the washer based nut 42 is tightened, the washer portion 42B is disposed apart from the external thread portion 3C. This prevents burrs from being generated by the frictional contact between the washer portion 42B and the external thread portion 3C.

Since the knock sensor 41 of the third embodiment is arranged to employ the washer based nut 42, the generation of the burr due to the tightening of the washer based nut 42 is completely prevented and therefore the insulation defective due to the burr is prevented. As a result, a short circuit that the voltage signal generated by the piezoelectric element 6 flows through the burr to the cylinder portion 3B or weight 9 is prevented. This improves the reliability of the knock sensor 41.

Figure 9:
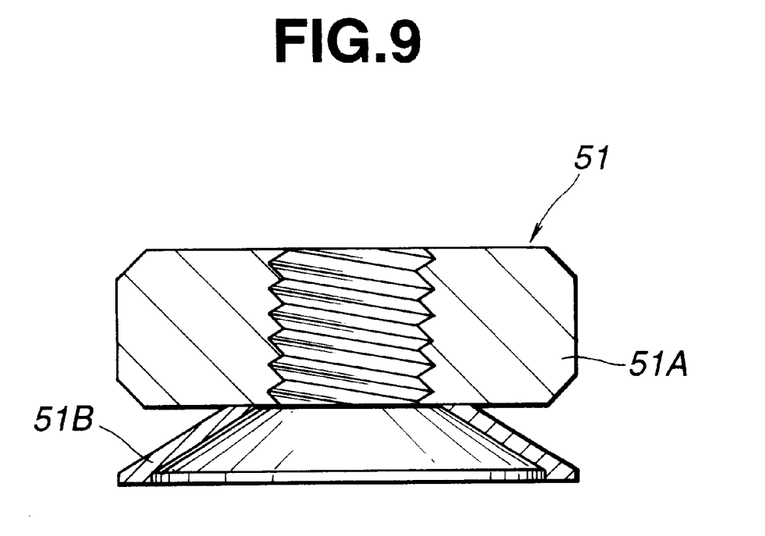
FIG. 9 is a cross sectional view which shows a modification of the washer based nut of the third embodiment.
Figure 10:
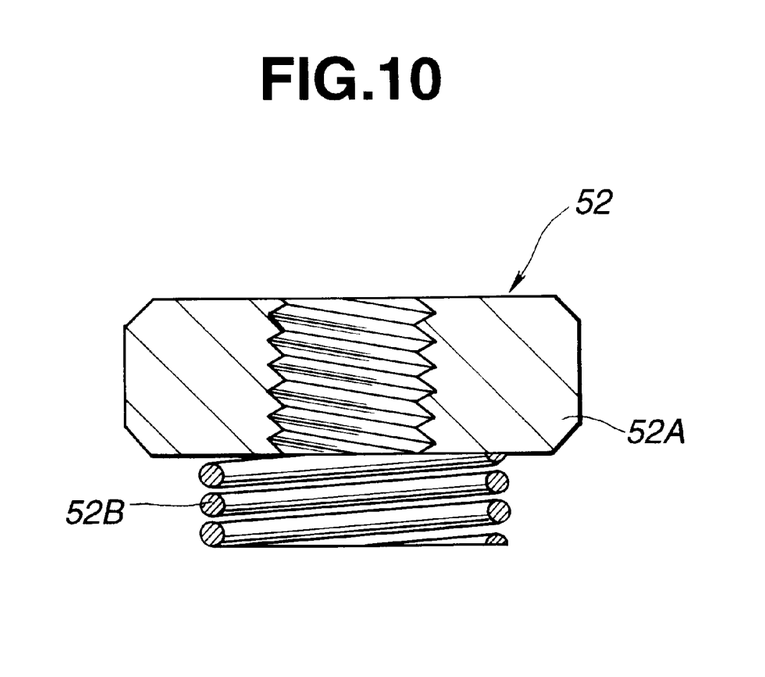
FIG. 10 is a cross sectional view which shows another modification of the washer based nut of the third embodiment.

Although the third embodiment has been shown and described to employ the washer based nut 42, it will be understood that the knock sensor 41 of the present invention is not limited to this nut 42 and may employ a washer based nut 51 formed by welding an initially coned disc spring 51B with a nut 51A as shown in FIG. 9. Also, the knock sensor 41 may employ a washer based nut 51 formed by welding a coil spring 52B with a nut 52A as shown in FIG. 10.

While each of the first to third embodiment of the knock sensor 21, 31, 41 according to the present invention has been arranged to solve each insulation effectively as mentioned above, it will be understood that the knock sensor may be arranged to properly combine the knock sensors 21, 31 and 41 described in the first to third embodiments.

What is claimed is:

1. A knock sensor comprising:

a housing including a disc-shaped flange portion and a cylinder portion perpendicularly extending from a center portion of the flange portion, the cylinder portion having an external thread portion;

an insulating tube covering the cylinder portion;

a lower lead plate formed into a disc shape having a center hole, said lower lead plate installed on the flange portion and around the cylinder portion through said insulating tube;

a piezoelectric element formed into a ring shape and installed on said lower lead plate and around the cylinder portion through said insulating tube;

an upper lead plate formed into a disc shape having a center hole, said upper lead plate installed on said piezoelectric element and around the cylinder portion through said insulating tube;

an insulating sheet formed into a disc shape having a center hole, said insulating sheet installed on said upper lead plate and around the cylinder portion through said insulating tube;

a weight formed into a ring shape and installed on said insulating sheet and around the cylinder portion through said insulating tube;

a disc spring installed on said weight and around the cylinder portion; and a nut installed on said disc spring and around the cylinder portion, said nut being tightly screwed to the external thread portion of the cylinder portion so as to fixedly sandwich said lower lead plate, said piezoelectric element, said upper lead plate, said insulating sheet, said weight and said disc spring between said nut and the flange portion of said housing;

wherein an inner peripheral edge of said weight is chamfered to form a chamfered surface portion.

2. A knock sensor comprising:

a housing including a disc-shaped flange portion and a cylinder portion perpendicularly extending from a center portion of the flange portion, the cylinder portion having an external thread portion;

an insulating tube covering the cylinder portion;

a lower lead plate formed into a disc shape having a center hole, said lower lead plate installed on the flange portion and around the cylinder portion through said insulating tube;

a piezoelectric element formed into a ring shape and installed on said lower lead plate and around the cylinder portion through said insulating tube;

an upper lead plate formed into a disc shape having a center hole, said upper lead plate installed on said piezoelectric element and around the cylinder portion through said insulating tube;

an insulating sheet formed into a disc shape having a center hole, said insulating sheet installed on said upper lead plate and around the cylinder portion through said insulating tube;

a weight formed into a ring shape and installed on said insulating sheet and around the cylinder portion through said insulating tube;

a disc spring installed on said weight and around the cylinder portion; and a nut installed on said disc spring and around the cylinder portion, said nut being tightly screwed to the external thread portion of the cylinder portion so as to fixedly sandwich said lower lead plate, said piezoelectric element, said upper lead plate, said insulating sheet, said weight and said disc spring between said nut and the flange portion of said housing;

wherein the cylinder portion has a circumferential groove at an adjacent portion of the external thread portion, said insulating tube fittingly covering the cylinder portion such that an end portion of said insulating tube is fitted with a surface of the circumferential groove by shrinking said insulating tube; and wherein an inner peripheral edge of said weight is chamfered to form a chamfered surface portion.

3. A knock sensor comprising:

a housing including a disc-shaped flange portion and a cylinder portion perpendicularly extending from a center portion of the flange portion, the cylinder portion having an external thread portion;

an insulating tube covering the cylinder portion;

a lower lead plate formed into a disc shape having a center hole, said lower lead plate installed on the flange portion and around the cylinder portion through said insulating tube;

a piezoelectric element formed into a ring shape and installed on said lower lead plate and around the cylinder portion through said insulating tube;

an upper lead plate formed into a disc shape having a center hole, said upper lead plate installed on said piezoelectric element and around the cylinder portion through said insulating tube;

an insulating sheet formed into a disc shape having a center hole, said insulating sheet installed on said upper lead plate and around the cylinder portion through said insulating tube;

a weight formed into a ring shape and installed on said insulating sheet and around the cylinder portion through said insulating tube; and a washer based nut installed on said disc spring and around the cylinder portion, said nut being tightly screwed to the external thread portion of the cylinder portion so as to fixedly sandwich said lower lead plate, said piezoelectric element, said upper lead plate, said insulating sheet, said weight and said disc spring between said nut and the flange portion of said housing, said washer based nut being constituted by a nut portion having an internal thread portioned screwed with the external thread portion and a disc spring portion integral with the nut portion.

4. A knock sensor as claimed in claim 1, wherein said weight has upper and lower chamfer portions by chamfering both inner peripheral edges of said weight.

5. A knock sensor as claimed in claim 1, wherein the chamfered surface portion is formed such that an inner diameter of a contact lower surface of said weight is greater than an inner diameter of each of said insulating sheet and said upper lead plate.

6. A knock sensor as claimed in claim 2, wherein the circumferential groove has a depth which is greater than a thickness of said insulating tube.

7. A knock sensor as claimed in claim 2, wherein the circumferential groove is formed at an intermediate portion of the cylinder portion and at a portion under the external thread portion.

8. A knock sensor as claimed in claim 2, wherein the circumferential groove is formed to have a tapered surface at a side of the flange portion such that said insulating tube smoothly follows along the tapered surface by the heating thereof.

9. A knock sensor as claimed in claim 3, wherein said washer based nut is formed by welding an initially coned disc spring with a nut.

10. A knock sensor as claimed in claim 3, wherein said washer based nut is formed by welding a coil spring with a nut.

11. A knock sensor as claimed in claim 1, wherein the cylinder portion has a circumferential groove at an adjacent portion of the external thread portion, said insulating tube fittingly covering the cylinder portion such that an end portion of said insulating tube is fitted with a surface of the circumferential groove by shrinking said insulating tube.

* * * * *